Patented May 12, 1942

2,282,505

UNITED STATES PATENT OFFICE 2,282,505

CATALYTIC ALKYLATION PROCESS

Hans G. Vesterdal, Elizabeth, N. J., assignor to Standard Oil Development Company, a corporation of Delaware No Drawing. Application July 27, 1940, Serial No. 348,019

8 Claims. (Cl. 196—10)

The present invention relates to the alkylation of saturated hydrocarbons of an isoparaffinic character with olefins, in particular monoolefins, in the presence of a novel alkylation catalyst to produce normally liquid saturated branched chain hydrocarbons chiefly boiling within the motor fuel boiling range.

The condensation of olefinic hydrocarbons, in particular the normally gaseous ones, with saturated aliphatic hydrocarbons, for example isoparaffins, also preferably normally gaseous, in the presence of various alkylation catalysts, promoters, activators and the like, is known. Thus, catalysts as, for example, aluminum halides, clays either natural or synthetic, either type being acid activated if desired, mineral acids such as, for example, concentrated sulfuric acid, metal halide double salt complexes with alkali metal halides and various other types of catalysts, have been employed in the alkylation reaction.

It is also well known to catalyze these reactions by carrying the same out in the presence of halo sulfonic acids such as, for example, fluorosulfonic acid, chlorosulfonic acid, or mixtures of these two. However, in connection with the use of chlorosulfonic acid as an alkylation catalyst it has been found that very specific reaction conditions are necessary in order to effect an efficient alkylation reaction with the attendant production of high yields of alkylate and at the same time to avoid excessive degradation of the catalyst. The proportions of reactants, both with respect to one another and with respect to the amount of catalyst present, must be carefully controlled and the temperature is kept very low in order to increase the catalyst life. Temperatures above 0° F. in cases where chlorosulfonic acid was used were found to be quite undesirable. Also, if such temperatures were employed the yields of the desirable products were very poor.

It is an object of the present invention to carry out the alkylation of isoparaffinic hydrocarbons with monoolefinic hydrocarbons in the presence of chlorosulfonic acid under such conditions and in the presence of such promoters as to attain excellent yields of substantially completely saturated branched chain, normally liquid hydrocarbons which are suitable for use as motor fuels or as blending agents for motor fuel base stocks.

It is a further object of the invention to carry out the alkylation reaction to produce a total yield of products in which the selectivity of the desired motor fuel fractions is extremely high as compared with respective yields of the same products when employing other alkylation catalysts. It is a still further object of the invention to carry out such alkylation reactions while employing liquid sulfur dioxide as a promoter or activator for the chlorosulfonic acid.

In order to accomplish these objects as well as others which will be apparent upon fuller understanding of the invention, chlorsulfonic acid diluted with liquid sulfur dioxide prior to being mixed with the hydrocarbon reactants is employed as an alkylation catalyst mixture for effecting the condensation of isoparaffins with monoolefins to produce normally liquid, saturated, branched chain hydrocarbons suitable for use, depending upon the choice of feed stocks, as aviation fuels, safety fuels, or regular grade high octane number motor fuels.

In contrast to the previous alkylation reaction procedure involving the use of chlorsulfonic acid, it has now been found possible to successfully employ temperatures ranging from between about 0° F. and about 100° F. In the light of past experience and in the absence of any liquid sulfur dioxide, the chlorsulfonic acid would be so completely disintegrated by such a procedure that any attempted alkylation process carried out along these lines would prove wholly unsuccessful. While the temperature may be kept within the above limits, it is preferred to operate between about 10° F. and about 40° F. in order to secure optimum results.

It has been found advantageous in previous alkylation experiments when employing other well-known alkylation catalysts such as, for example, concentrated sulfuric acid, to maintain a substantial excess of isoparaffin in the reaction zone with respect to the olefinic contents of said reaction zone and to operate in a medium containing large quantities of catalyst. While it is desirable for optimum results in the present invention to maintain at least a 2:1 molar ratio of isoparaffin to monoolefin in the feed stock and in the reaction mixture, nevertheless excellent yields of the desired highly selective alkylates are obtained when using equal molar ratios of isoparaffins to monoolefins. This ability to produce excellent yields over a wide range of reactant mol ratios is quite advantageous from a standpoint of reduced operating costs and reduced supervision of commercial units since undue care is unnecessary in adjusting the composition of any particular feed stock to conform to any specified molar ratios as between the isoparaffins and olefins entering the reactor.

While it is desirable in some instances to recycle the heavier and lighter products of the reaction, that is, those products which are not desired, nevertheless such recycling plays no important part in the securing of ultimate high yields of the desired motor fuel fractions since the product produced by the present reaction inherently appears to comprise large percentages of motor fuel fractions of a desired boiling range when the feed stocks are suitably selected to give the desired boiling range products. Furthermore, the unique ability of the chlorsulfonic acid to substantially completely alkylate practically any concentration of olefins in the feed stock, irrespective of the molar ratios existing between the isoparaffins and monoolefins, is a distinct advantage, so much so that it is quite feasible and economically desirable to effect alkylation with chlorsulfonic acid in the presence of liquid sulfur dioxide in a once through operation. It will be readily appreciated, however, that any liquid sulfur dioxide and chlorsulfonic acid which may be carried over with the final product may be separated by suitable fractionation and the liquid sulfur dioxide and chlorsulfonic acid may either be returned to the reactor as an admixture or they may be returned separately in the desired amounts.

Although it is preferred to use isobutane, isopentane, or mixtures containing isobutane and/or isopentane as the isoparaffinic component of the feed stock, it is likewise feasible to employ the higher homologues or mixtures containing such homologues especially where the production of safety fuels, aviation naphthas and the like are desired as the final products. The presence of the normal paraffins in admixture with the isoparaffins in no way tends to destroy the reactivity of the isoparaffins with respect to the olefinic components of the reaction mixture. These normal paraffins appear to be substantially inert in the reaction.

Olefinic reactants may be selected from any number of the common olefins present in a refinery. For example, ethylene, propylene, normal butylenes, isobutylene, trimethyl ethylene, and the isomeric pentenes and similar higher monoolefinic hydrocarbons of either a straight chain or branched chain structure, may be employed. Likewise, mixtures of two or more of these olefins may be used as the olefinic components of the feed stock going to the alkylation reaction. For economic reasons, it is generally preferred to employ normally gaseous olefins as the olefinic components of the reaction mixture, but this is not essential. Normally liquid monoolefins are equally desirable so far as the successful operation of the process is concerned. Polymers, copolymers, interpolymers, etc., of the above-mentioned monoolefins may be employed, such as, for example, diisobutylene, triisobutylene, the polymers resulting from the condensation of normal butylenes with isobutylene, of butadiene with butylenes, etc.

Suitable sources of these various olefins and isoparaffins are to be found in the refinery gases which are on hand and which may come from the thermal and catalytic cracking units, from field butanes which have been subjected to prior isomerization and/or partial dehydrogenation treatments, from refinery stabilizer bottoms, from stabilizer overhead gases, and from the various other suitable sources of olefins and isoparaffins. Any diolefins present in the refinery gases may either be removed by preliminary treatment, as for example with sulfuric acid, or if the nature of the final product permits they may be left in the feed stock and alkylated in much the same manner as the monoolefins.

The process may be carried out either as a batch continuous or semi-continuous type of operation, although for economic reasons in commercial practice it is usually preferable to carry it out as a continuous operation. The reaction mixture should be intimately contacted with the catalyst since apparently the better the contact the higher the yield of saturated products obtained. In the case of batch operations, vigorous mechanical agitation or shaking is adequate. For continuous operations the use of jets, porous thimbles, turbo mixers and the like, and the use of superatmospheric pressure sufficient to maintain the reactants in the liquid phase are desirable features to employ.

No special type of apparatus is required in carrying out the process of the present invention. The usual conventional polymerization or alkylation equipment is entirely satisfactory. However, in order to preserve the equipment it is desirable to take special precautions for preventing water from entering the system since increased corrosion difficulties result by reason of the fact that water reacts with the catalyst to form corrosive compounds which readily attack the structural steel of the unit, thereby necessitating increased replacement with attendant costs.

The chlorsulfonic acid used may be concentrated acid either of the chemically pure grade or of a commercial grade. The commercial grade is usually contemplated. This has a concentration of slightly less than 100% by reason of the impurities contained therein and which are present because of the particular process of manufacture.

The sulfur dioxide employed may be obtained from any suitable commercial source and need not be of any higher degree of purity than is required for the chlorsulfonic acid. A small compressor may be employed in conjunction with the alkylation unit for preliquefying the sulfur dioxide prior to its introduction into the alkylation system. However, the pressures employed in the alkylation system are only those sufficient to maintain the sulfur dioxide and the hydrocarbons in liquid condition under the reaction conditions obtaining. As previously stated, the sulfur dioxide going over with the product may be readily removed by simple fractional distillation, treatment and returned as desired to the reaction zone.

After prolonged usage, the chlorsulfonic acid may to some extent lose its activity, in which case it may be removed from the system and subjected to any suitable reactivation or restoration treatment. A suitable method comprises heating the spent acid with elemental sulfur or carbon to liberate HCl and either sulfur dioxide or carbon dioxide as the case may be. Since the catalyst composition is formed by adding sulfur dioxide to the chlorsulfonic acid, the preferred procedure is to employ elemental sulfur for this treatment. If desired, the sulfur dioxide may be converted by catalytic oxidation into sulfur trioxide and absorbed in dilute sulfuric acid by the contact process to produce concentrated sulfuric acid, or the resulting sulfur trioxide may be directly contacted with the hydrogen chloride formed upon treating the spent acid with sulfur, in which case the chlorsulfonic acid is reformed. Any suitable method of regeneration is contemplated and the invention is not limited in this respect.

In general, the length of time necessary for obtaining high yields of the desired product depends upon the various reactants, strength and purity of acid employed, quantity of sulfur dioxide, degree of agitation, temperature, and various other reaction conditions. Contact times between about 10 minutes and about 4 hours are generally adequate, although it is contemplated that where necessary reaction times outside of this range may be specifically employed. When employing temperatures of between about 10° F. and about 40° F., commercial chlorsulfonic acid, commercial liquid sulfur dioxide and the lower isoparaffins and monoolefins, for example, those which are normally gaseous, the contact time need not in most cases exceed 60 minutes, especially so where the mixture is intensively agitated during the entire period.

The amount of liquid sulfur dioxide may vary considerably with respect to the amount of chlorsulfonic acid employed. Thus, for example, the amount of liquid sulfur dioxide on a weight basis may vary between about 10% and about 50% of the total catalyst composition of which the remaining portion is chiefly chlorsulfonic acid. If desired, the reaction may be carried out substantially in a medium of liquid sulfur dioxide, although from an economic standpoint it is generally not preferred to employ such large quantities of the liquid sulfur dioxide.

As illustrative of the mode of carrying out the process of the present invention, but without unduly restricting the invention to the scope specifically disclosed, the following examples are submitted:

Example 1

880 cc. of isopentane was mixed with about 200 cc. of liquid sulfur dioxide and about 200 cc. of chlorsulfonic acid at a temperature of about 14° F. This mixture was intensively agitated and over a period of about 40 minutes 119 cc. of diisobutylene was added thereto. At the conclusion of the olefin addition, the mixing was continued for an additional 20 minutes. The catalyst composition was separated from the hydrocarbon layer. The hydrocarbon layer contained about 78.5 grams of hydrocarbons boiling above the isopentane boiling range and was substantially completely saturated in character, hence its bromine number was around 4. The catalyst layer was substantially clear and light colored at the end of the run, showing no indication of sludge formation by reason of its catalytic activity in the reaction.

Example 2

To a mixture of 322 cc. of chlorsulfonic acid and 107 cc. of liquid sulfur dioxide there was added 1370 cc. of isopentane. While thoroughly mixing this composition, 168 grams of diisobutylene were slowly added over a period of 40 minutes while the temperature of the reactor was maintained between about 25 and about 30° F. by means of refluxed sulfur dioxide. At the completion of the olefin addition, the reaction mixture was maintained under reaction conditions for an additional 20 minutes, at the end of which time the catalyst layer, which was light colored, was separated from the hydrocarbon layer and the hydrocarbon layer was fractionated to give 172.5 grams of product boiling above the isopentane range. About 90.2% of the product boiled within the range 105–296° F. and constituted a $C_6$–$C_{10}$ cut. It had a bromine number of about 7.

In a similar reaction carried out when using concentrated sulfuric acid, the maximum yield of $C_6$–$C_{10}$ cut obtained was about 80% of the product boiling above the range of the reactants.

The yield of $C_6$ and heavier alkylate in Example 2 amounted to about 113% by weight based on the total diisobutylene added to the reaction mixture. The yield would obviously be greatly improved were the reaction carried out in a continuous or semi-continuous closed system in which the liquid sulfur dioxide could be separated from the alkylate by fractional distillation and returned to the acid so as to keep the acid to sulfur dioxide ratio at the desired level and the catalyst could then be used over and over again so as to reduce the loss of hydrocarbon due to its solubility in the catalyst layer.

The nature and objects of the invention having been thus described and illustrated, what is claimed as new and useful and desired to be secured by Letters Patent is:

1. A process for the production of normally liquid, branched chain hydrocarbons, substantially completely saturated in character, which comprises condensing isoparaffins with monoolefins in the presence of chlorsulfonic acid and sulfur dioxide under alkylation reaction conditions.

2. A process for the production of normally liquid, branched chain hydrocarbons, substantially completely saturated in character, which comprises condensing iroparaffins with monoolefins at temperatures between about 10 and about 100° F. in the presence of a catalyst composition comprising chlorsulfonic acid and liquid sulfur dioxide.

3. A process as in claim 2 wherein the isoparaffinic component of the feed stock contains isopentane and wherein the olefinic component of the feed stock contains at least one normally gaseous monoolefin.

4. A process as in claim 2 wherein the isoparaffinic component of the feed stock contains isopentane and wherein the olefinic component of the feed stock contains at least one normally gaseous monoolefin, wherein the isoparaffinic component of the feed stock is present in substantial molar excess of the olefinic component thereof and wherein the temperature is maintained between about 10 and about 40° F.

5. A process which comprises reacting a refinery $C_4$ cut containing isobutane and at least one $C_4$ monoolefin with a catalyst composition comprising chlorsulfonic acid and liquid sulfur dioxide, at a temperature between about 10 and about 100° F., under sufficient superatmospheric pressure to maintain the catalyst composition and reactants in the liquid phase under the reaction conditions obtaining.

6. A process as in claim 5 wherein the liquid sulfur dioxide constitutes between about 10% and about 50% by weight of the catalyst composition.

7. A process which comprises reacting isopentane with diisobutylene in the presence of a catalyst composition comprising liquid sulfur dioxide and chlorsulfonic acid at a temperature of about 14° F., and recovering a substantially completely saturated product boiling within the motor fuel boiling range.

8. A process which comprises reacting isopentane with diisobutylene, the isopentane being in substantial molar excess over the diisobutylene, at a temperature of between about 25 and about 30° F., with intensive agitation for a period of about one hour total reaction time in the presence of a catalyst composition comprising liquid sulfur dioxide and chlorsulfonic acid.

HANS G. VESTERDAL.